(12) United States Patent
Beste et al.

(10) Patent No.: US 8,890,531 B2
(45) Date of Patent: Nov. 18, 2014

(54) SYSTEMS AND METHODS HAVING POT CORE ANTENNAS FOR ELECTROMAGNETIC RESISTIVITY LOGGING

(75) Inventors: Randal T. Beste, Houston, TX (US); Michael S. Bittar, Houston, TX (US); Jesse K. Hensarling, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 865 days.

(21) Appl. No.: 12/300,876

(22) PCT Filed: Jan. 29, 2007

(86) PCT No.: PCT/US2007/061220
§ 371 (c)(1),
(2), (4) Date: Nov. 14, 2008

(87) PCT Pub. No.: WO2008/094256
PCT Pub. Date: Aug. 7, 2008

(65) Prior Publication Data
US 2009/0278543 A1      Nov. 12, 2009

(51) Int. Cl.
*G01V 3/10* (2006.01)
*G01V 3/28* (2006.01)

(52) U.S. Cl.
CPC ........................................ *G01V 3/28* (2013.01)
USPC ......................................................... 324/339

(58) Field of Classification Search
USPC ................. 324/339, 247–260, 338, 328, 325, 324/347–460
See application file for complete search history.

(56) References Cited

U.S. PATENT DOCUMENTS

| | | | |
|---|---|---|---|
| 5,389,881 A | 2/1995 | Bittar et al. | |
| 5,463,319 A | 10/1995 | Chesnutt | |
| 5,501,285 A | 3/1996 | Lamine et al. | |
| 5,679,894 A | 10/1997 | Kruger et al. | |
| 5,712,566 A * | 1/1998 | Taicher et al. | 324/303 |
| 5,720,355 A | 2/1998 | Lamine et al. | |
| 6,057,784 A | 5/2000 | Schaaf et al. | |
| 6,163,155 A | 12/2000 | Bittar | |

(Continued)

FOREIGN PATENT DOCUMENTS

AU       2007345650       9/2011

OTHER PUBLICATIONS

PCT International Search Report and Written Opinion, dated Nov. 19, 2007, Appl No. PCT/US2007/061220, "Systems and Method Having Radially Offset Antennas for Electromagnetic Resistivity Logging", filed Jan. 29, 2007.

(Continued)

*Primary Examiner* — Melissa Koval
*Assistant Examiner* — Trung Nguyen
(74) *Attorney, Agent, or Firm* — Krueger Iselin LLP; Benjamin Fite

(57) ABSTRACT

Disclosed herein are electromagnetic resistivity logging systems and methods that employ magnetic dipole antennas embedded in wall-contacting surfaces. In some embodiments, the antennas are pot-core or ferrite-rod antennas. Prototypes of electromagnetic resistivity logging tools having such antennas exhibit good resistivity logging performance in both water-based and oil-based borehole fluids, indicating that this architecture may yield a logging tool that is suitable for use with borehole fluids of all types. Moreover, the tool offers good spatial resolution, enabling the creation of formation resistivity images for the borehole walls.

18 Claims, 11 Drawing Sheets

(56) References Cited

U.S. PATENT DOCUMENTS

| | | | |
|---|---|---|---|
| 6,173,793 B1 | 1/2001 | Thompson et al. | |
| 6,191,586 B1 | 2/2001 | Bittar | |
| 6,218,842 B1 | 4/2001 | Bittar | |
| 6,353,321 B1 | 3/2002 | Bittar | |
| 6,359,438 B1 | 3/2002 | Bittar | |
| 6,471,030 B1 * | 10/2002 | Neubarth et al. | 194/317 |
| 6,476,609 B1 | 11/2002 | Bittar | |
| 6,489,772 B1 | 12/2002 | Holladay et al. | |
| 6,538,447 B2 | 3/2003 | Bittar | |
| 6,606,565 B1 | 8/2003 | Strickland et al. | |
| 6,739,409 B2 * | 5/2004 | Kruspe et al. | 175/50 |
| 6,810,331 B2 | 10/2004 | Bittar et al. | |
| 6,850,068 B2 | 2/2005 | Chemali et al. | |
| 6,856,288 B2 * | 2/2005 | Apostolos et al. | 343/700 MS |
| 6,885,943 B2 | 4/2005 | Bittar et al. | |
| 6,911,824 B2 | 6/2005 | Bittar | |
| 6,944,546 B2 | 9/2005 | Xiao et al. | |
| 7,019,528 B2 | 3/2006 | Bittar | |
| 7,038,455 B2 | 5/2006 | Beste et al. | |
| 7,046,010 B2 | 5/2006 | Hu et al. | |
| 7,098,664 B2 | 8/2006 | Bittar et al. | |
| 7,098,858 B2 | 8/2006 | Bittar et al. | |
| 7,138,803 B2 | 11/2006 | Bittar | |
| 7,227,363 B2 | 6/2007 | Gianzero et al. | |
| 7,265,552 B2 | 9/2007 | Bittar | |
| 7,268,688 B2 * | 9/2007 | Juds | 340/572.8 |
| 7,336,199 B2 | 2/2008 | Lasater et al. | |
| 7,345,487 B2 | 3/2008 | Bittar et al. | |
| 7,350,568 B2 | 4/2008 | Mandal et al. | |
| 7,385,400 B2 * | 6/2008 | Moore | 324/338 |
| 7,427,863 B2 | 9/2008 | Bittar | |
| 7,659,722 B2 | 2/2010 | Bittar | |
| 7,839,148 B2 | 11/2010 | Vehra et al. | |
| 8,030,937 B2 | 10/2011 | Hu et al. | |
| 2002/0133115 A1 * | 9/2002 | Gordon et al. | 604/96.01 |
| 2004/0019427 A1 | 1/2004 | San Martin et al. | |
| 2005/0006090 A1 | 1/2005 | Chemali et al. | |
| 2005/0068036 A1 | 3/2005 | Wang et al. | |
| 2005/0099184 A1 | 5/2005 | Gianzero et al. | |
| 2005/0189143 A1 | 9/2005 | Cole | |
| 2005/0189946 A1 | 9/2005 | Moore | |
| 2006/0015257 A1 | 1/2006 | Hassan et al. | |
| 2006/0183373 A1 | 8/2006 | Finke et al. | |
| 2006/0186888 A1 | 8/2006 | Wang et al. | |
| 2006/0219438 A1 | 10/2006 | Moore et al. | |
| 2007/0229082 A1 | 10/2007 | Vehra et al. | |
| 2008/0078580 A1 | 4/2008 | Bittar | |
| 2008/0252296 A1 | 10/2008 | Hu et al. | |
| 2009/0015260 A1 | 1/2009 | Bittar et al. | |

OTHER PUBLICATIONS

International Preliminary Report on Patentability, dated Aug. 13, 2009, Appl No. PCT/US2007/061220, "Systems and Method Having Radially Offset Antennas for Electromagnetic Resistivity Logging", filed Jan. 29, 2007, 2 pgs.

AU First Examiner's Report, dated Apr. 9, 2010, Appl No. 2007345650, Systems and Method Having Radially Offset Antennas for Electromagnetic Resistivity Logging, filed Nov. 6, 2008, 2 pgs.

AU Second Examiner's Report, dated Feb. 25, 2011, Appl No. 2007345650, Systems and Method Having Radially Offset Antennas for Electromagnetic Resistivity Logging, filed Nov. 6, 2008, 2 pgs.

First Indian Examination Report, dated Nov. 19, 2012, Appl No. 8032/DELNP/2007, "A System and Method Having Radially Offset Antennas for Electromagnetic Resistivity Logging", filed Jan. 29, 2007, 2 pgs.

* cited by examiner

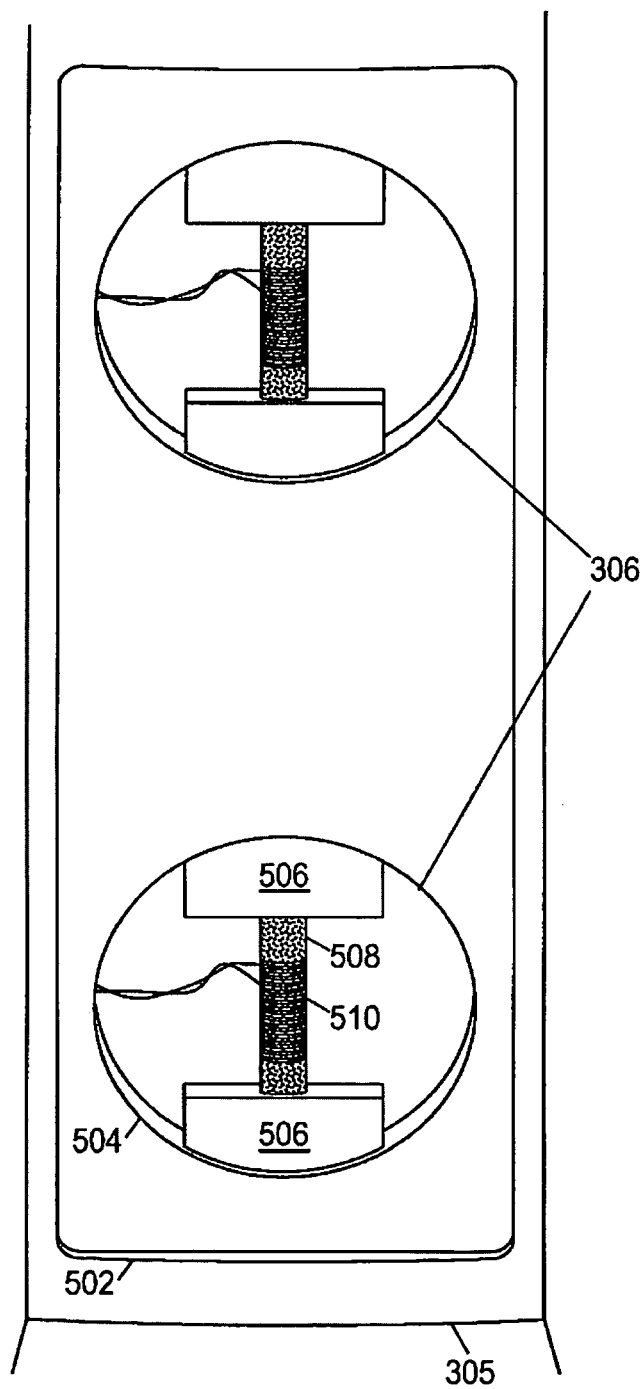

SYSTEMS AND METHODS HAVING POT CORE ANTENNAS FOR ELECTROMAGNETIC RESISTIVITY LOGGING

BACKGROUND

The basic principles and techniques for electromagnetic logging for earth formations are well known. For example, induction logging to determine the resistivity (or its inverse, conductivity) of earth formations adjacent a borehole has long been a standard and important technique in the search for and recovery of subterranean petroleum deposits. In brief, a transmitter transmits an electromagnetic signal that passes through formation materials around the borehole and induces a signal in one or more receivers. The amplitude and/or phase of the receiver signals are influenced by the formation resistivity, enabling resistivity measurements to be made. The measured signal characteristics and/or formation properties calculated therefrom are recorded as a function of the tool's depth or position in the borehole, yielding a formation log that can be used by analysts.

Note, however, that the resistivity of a given formation may be isotropic (equal in all directions) or anisotropic (unequal in different directions). Formation resistivity logging is further complicated by the presence of borehole fluids. Drillers employ borehole fluids to cool the drill bit, remove drill cuttings, and to preserve the integrity of the borehole. Some borehole fluids are water-based and tend to be fairly conductive, while other borehole fluids are oil-based and tend to be highly resistive. While various existing resistivity logging tools perform well in water-based fluids, the options for resistivity logging in oil-based fluids are much more limited.

BRIEF DESCRIPTION OF THE DRAWINGS

A better understanding of the various disclosed embodiments can be obtained when the following detailed description is considered in conjunction with the following drawings, in which:

FIG. 5 shows an illustrative pair of ferrite rod antennas;

Figure 1:
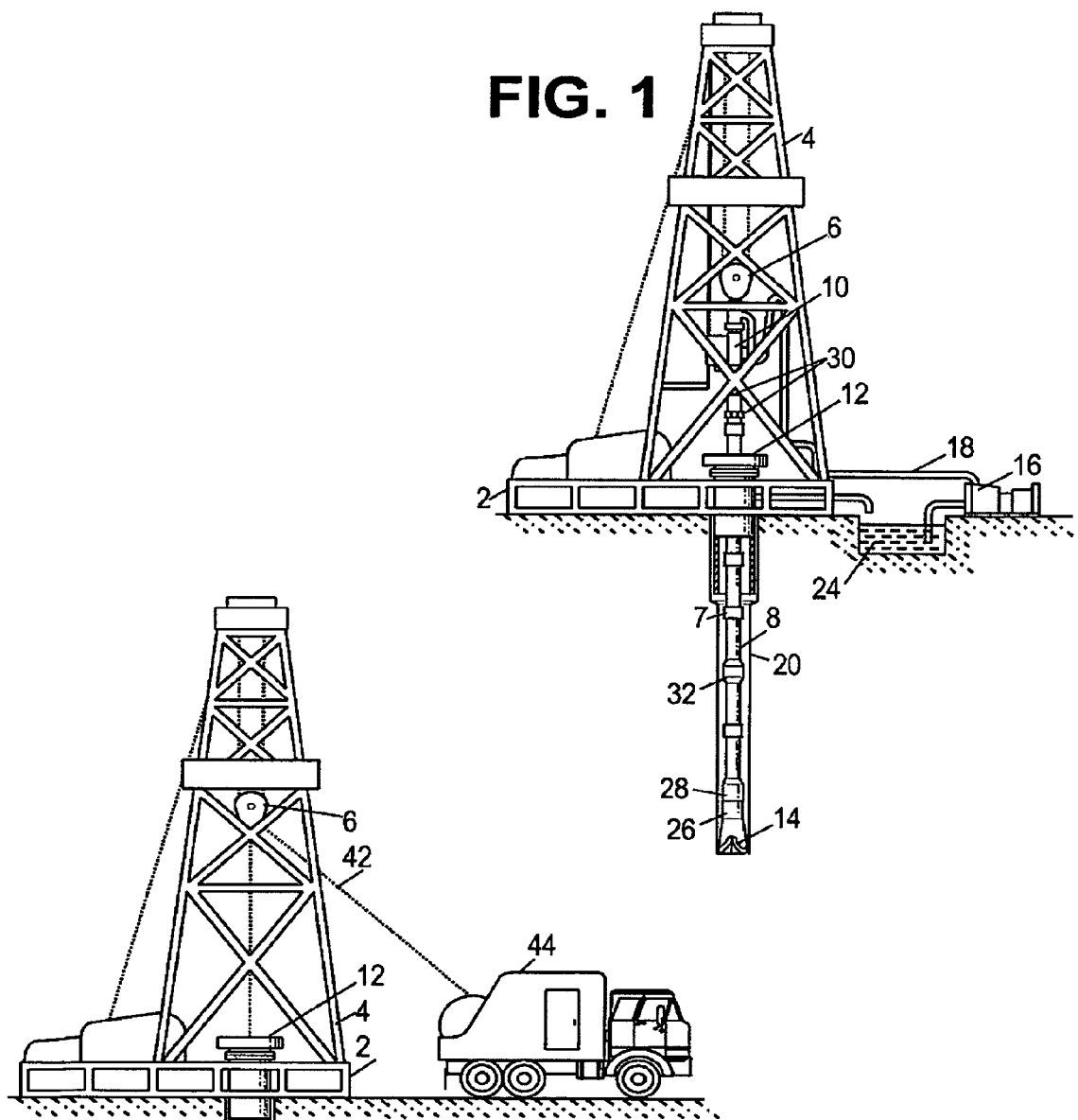
FIG. 1 shows an illustrative logging while drilling (LWD) environment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the appended claims.

DETAILED DESCRIPTION

Disclosed herein are electromagnetic resistivity logging systems and methods that employ magnetic dipole antennas embedded in wall-contacting surfaces. Prototypes of electromagnetic resistivity logging tools having such antennas exhibit good resistivity logging performance in both water-based and oil-based borehole fluids, suggesting that this architecture may yield a logging tool that is suitable for use with borehole fluids of all types. Moreover, the tool offers good spatial resolution, enabling the creation of formation resistivity images for the borehole walls.

The disclosed tool configurations and operations are best understood in the context of the larger systems in which they operate. Accordingly, an illustrative logging while drilling (LWD) environment is shown in FIG. 1. A drilling platform 2 is equipped with a derrick 4 that supports a hoist 6 for raising and lowering a drill string 8. The hoist 6 suspends a top drive 10 that is used to rotate the drill string 8 and to lower the drill string through the well head 12. Connected to the lower end of the drill string 8 is a drill bit 14. The bit 14 is rotated and drilling accomplished by rotating the drill string 8, by use of a downhole motor near the drill bit, or by both methods. Drilling fluid, termed "mud", is pumped by mud recirculation equipment 16 through supply pipe 18, through top drive 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer (not specifically shown), and into a mud pit 24 on the surface. On the surface, the drilling mud is cleaned and then recirculated by recirculation equipment 16. The drilling mud is used to cool the drill bit 14, to carry cuttings from the base of the bore to the surface, and to balance the hydrostatic pressure in the rock formations.

In wells employing acoustic telemetry for LWD, downhole sensors (including resistivity logging tool 26) are coupled to an acoustic telemetry transmitter 28 that transmits telemetry signals in the form of acoustic vibrations in the tubing wall of drill string 8. An acoustic telemetry receiver array 30 may be coupled to tubing below the top drive 10 to receive transmitted telemetry signals. One or more repeater modules 32 may be optionally provided along the drill string to receive and retransmit the telemetry signals. The repeater modules 32 include both an acoustic telemetry receiver array and an acoustic telemetry transmitter configured similarly to receiver array 30 and the transmitter 28.

Electromagnetic resistivity logging tool 26 is integrated into the bottom-hole assembly near the bit 14. As the bit extends the borehole through the formations, the downhole sensors collect measurements relating to various formation properties as well as the tool orientation and position and various other drilling conditions. (The orientation measurements may be performed using an azimuthal orientation indicator, which may include magnetometers, inclinometers, and/or accelerometers, though other sensor types such as gyroscopes may be used. In some embodiments, the tool includes a 3-axis fluxgate magnetometer and a 3-axis accelerometer.) Electromagnetic resistivity logging tool 26 may take the form of a drill collar, i.e., a thick-walled tubular that provides weight and rigidity to aid the drilling process.

Figure 2:
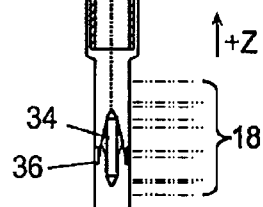
FIG. 2 shows an illustrative wireline logging environment.

At various times during the drilling process, the drill string 8 may be removed from the borehole as shown in FIG. 2.

Once the drill string has been removed, logging operations can be conducted using a wireline logging tool 34, i.e., a sensing instrument sonde suspended by a cable 42 having conductors for transporting power to the tool and telemetry from the tool to the surface. A resistivity imaging portion of the logging tool 34 may have centralizing arms 36 that center the tool within the borehole as the tool is pulled uphole. The centralizing arms 36 may be equipped with sensor pads that are maintained in close contact with the borehole wall to gather logging data. A logging facility 44 collects measurements from the logging tool 34, and includes computing facilities for processing and storing the measurements gathered by the logging tool.

Figure 3:
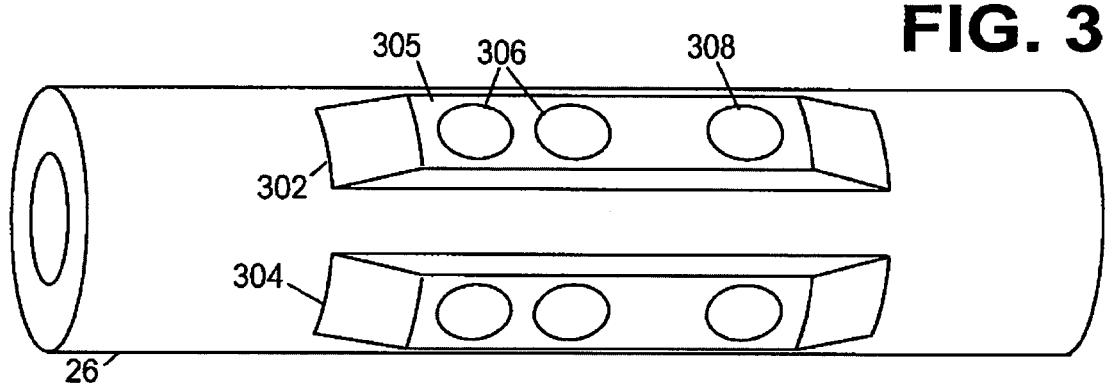
FIG. 3 shows an illustrative LWD tool having transmitter and receiver antennas embedded in wall-contacting surfaces.

FIG. 3 shows an illustrative electromagnetic resistivity logging tool 26. Logging tool 26 is shown as a drill collar having stabilizer fins 302 and 304. The stabilizer fins may cooperate with additional stabilizer fins to keep the tool centered in the borehole. Each of the stabilizer fins has a surface 305 for contacting the wall of the borehole. Although this contact surface is not necessarily always in contact with the borehole wall, the separation is usually less than 2 inches. Thus, sensors embedded in surface 305 will be maintained in close proximity to the borehole wall. Illustrative logging tool 26 includes a pair of receiver antennas 306 and a transmitter antenna 308 embedded on the contact surface of at least one stabilizer fin, and preferably embedded on the contact surface of each stabilizer fin. In the illustrative tool, the antennas occupy no more than 20% of the circumference (72 degrees of arc) and preferably less than about 10% (36 degrees of arc).

As the borehole is extended during the drilling process, logging tool 26 progresses along the length of the borehole, rotating as it goes. Transmitter antenna 308 periodically transmits an electromagnetic signal into the formation. Receiver antennas 306 each receive a response signal from the formation. The receiver electronics measure the attenuation (amplitude ratio) and the phase shift of the receive signals between the receiver antennas, or alternatively the attenuation and phase shift with respect to the transmit signal. In either case, the attenuation and/or the phase shift may be used to estimate formation resistivity at the midpoint between the receiver antennas 306 or at the midpoint between a transmitter antenna and a receiver antenna. In logging tool embodiments having multiple transmitter antennas, the transmitter antennas may be fired sequentially. As an alternative multiple transmitter antennas may be fired simultaneously with each transmitter having its own transmit signal frequency.

Figure 4A:
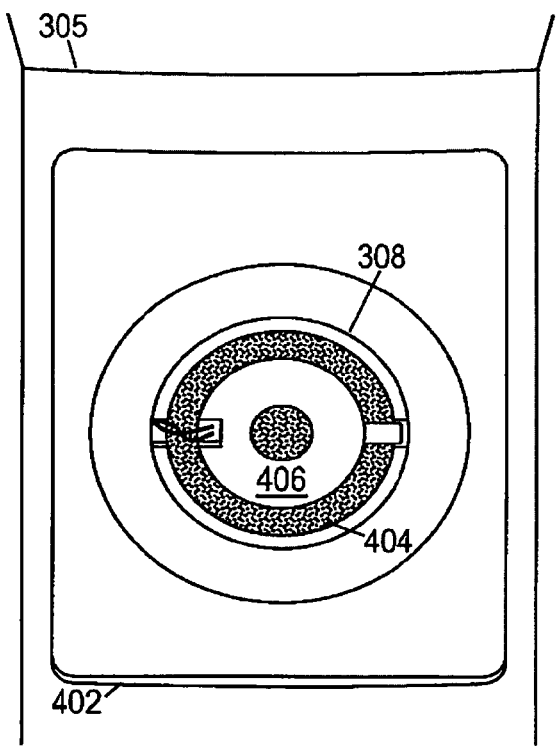
FIGS. 4a and 4b show an illustrative pot core antenna.

FIG. 4A shows an illustrative transmitter antenna 308 embedded in a contact surface 305. A first recess 402 may be provided for a protective cover, and within recess 402 a second recess may be placed to contain transmitter antenna 308. To enable transmission of electromagnetic signals, the protective cover may be an insulating, non-magnetic material, such as PEEK (polyetheretherketone), or it may include slots or apertures that pass such signals. The cover may be secured in place by screws or other means.

Figure 4B:
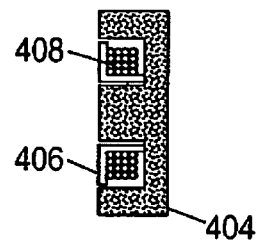

As shown in the cross sectional view in FIG. 4B, the illustrated transmitter antenna 308 is a pot-core antenna. That is, transmitter antenna 308 includes a wire coil 408 wound on a bobbin 406 and positioned in a ferrite half-torus 404. Bobbin 406 preferably consists of an insulating, non-magnetic material. An insulating, non-magnetic potting material may fill the remaining space in the half torus 404 and secure the winding and bobbin in place. In the prototype embodiment, the half-torus is half of a Ferroxcube 42×26 Pot Core of "3F3" material. The winding is 11 turns of 24 gauge HML (Heavy Polyimide Enamel) magnet wire. The inductance was measured at 13.5 μH, with a complex impedance of $Z=3.4+j169\Omega$ at 2 MHz. When an alternating current is applied to the wire coil, an alternating magnetic field is projected into the formation.

FIG. 5 shows a pair of illustrative receiver antennas 306 embedded in a contact surface 305. As with the transmitter antenna, a first recess 502 may be provided for a protective cover that enables passage of electromagnetic signals. Within the first recess 502 are deeper recesses 504 for containing receiver antennas 306. The illustrated receiver antennas 306 are ferrite rod antennas. That is, each receiver antenna 306 includes a wire coil 510 wound on a ferrite rod 508. The ferrite rod 508 may be secured within recesses 504 by support blocks 506, which may be an insulating, non-magnetic material such as PEEK. In the prototype embodiment, the ferrite rods are about 1.3 inches in length and about 0.25 inches in diameter. The material is "Fair-Rite 61". For the receiver antennas, the winding is 20 turns of 24 gauge HML magnet wire. In a second prototype embodiment, a ferrite rod antenna with 15 turns was used as a transmitter antenna. The ferrite rod antenna is oriented with its axis parallel to the tool axis, and transmits or receives alternating magnetic fields oriented parallel to the tool axis, with particular sensitivity in the azimuthal direction of the surface in which the antenna is embedded.

Figure 7:
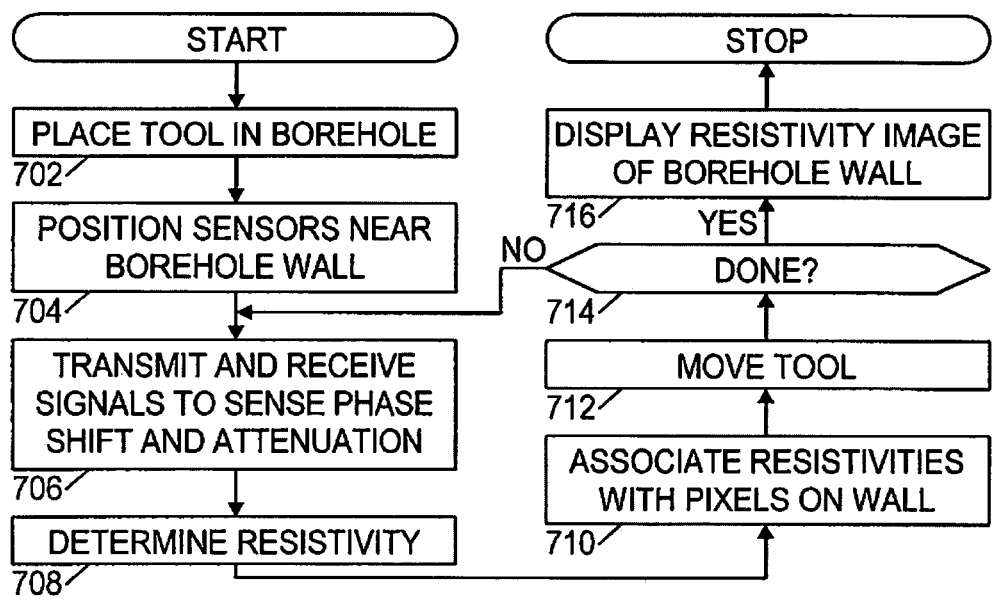
FIG. 7 shows an illustrative electromagnetic resistivity imaging method.

FIG. 7 shows an illustrative resistivity imaging method. In block 702, the resistivity imaging tool is placed in a borehole. For LWD, the tool is part of the bottom hole assembly to perform logging as drilling operations are performed. For wireline logging, the tool is part of a sonde that is lowered to the bottom of the region of interest to perform logging as the logging tool is pulled uphole at a steady rate.

In block 704, the tool is placed in logging mode. For LWD, this operation may (or may not) involve deploying a de-centralizer that forces sensors in the tool body against the borehole wall. Alternatively, the LWD resistivity imaging tool may have one or more extension mechanisms or stabilizer fins that place sensors in contact or close proximity to the borehole wall. For wireline logging, multiple centralizer arms maintain sensor pads in contact with the borehole wall.

Blocks 706-714 represent operations that occur during the logging process. Though shown and described in a sequential fashion, the various operations may occur concurrently, and moreover, they may simultaneously occur for different transmitter antennas.

In block 706, the tool transmits an electromagnetic signal from one or each of the transmitter antennas and measures the phase and attenuation of electromagnetic signals received by the receiver antennas. In block 708, the tool determines a resistivity measurement in response to each transmitted signal, e.g., by performing a table look-up for the measured attenuation and phase shift. In block 710, the tool, or more likely, the surface logging facility coupled to the tool, associates the compensated resistivity measurements with a tool position and orientation measurement, thereby enabling a determination of image pixel values for imaging the rock formation surrounding the borehole.

In block 712, the tool moves along the borehole, and in block 714, a check is performed to determine whether logging operations should continue (e.g., whether the logging tool has reached the end of the region of interest). For continued logging operations, blocks 706-714 are repeated. Once logging operations are complete (or in some embodiments, while the logging operations are ongoing), the surface logging facility maps the resistivity measurements into borehole wall image pixels and displays the resulting resistivity image of the surrounding formations in block 716.

Figure 6:
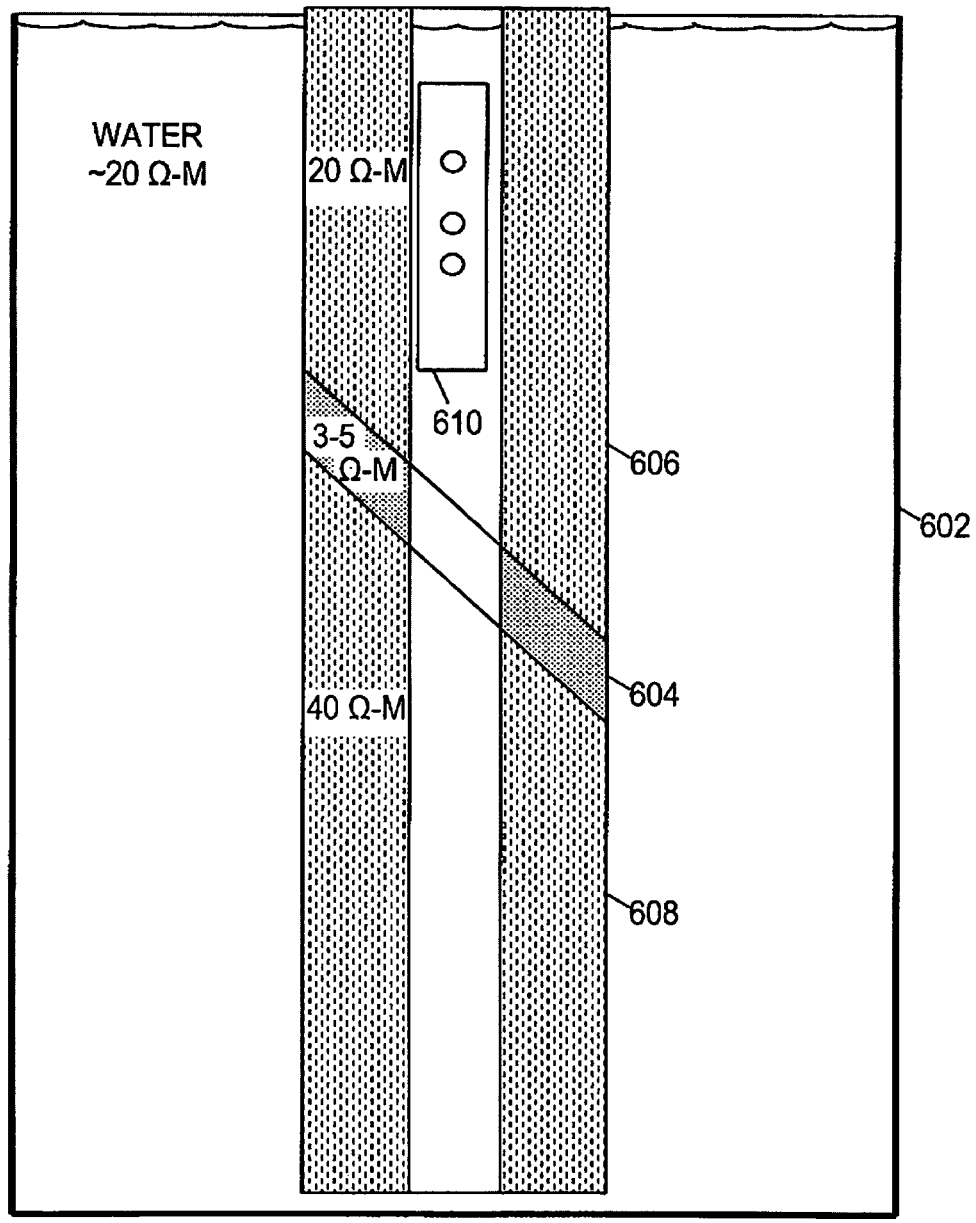
FIG. 6 shows an illustrative test environment.

FIG. 6 shows an illustrative test environment in which a 6-foot diameter tank 602 contains a synthetic formation having a dipping thin bed 604 sandwiched between two thick beds 606 and 608. The thick beds consisted of mixtures of silica sand and Portland cement, while the dipping bed consisted of a mixture of gel and cement. The formation is about 2 foot in diameter, with a 8.5 inch borehole. The upper bed is about 3.5 feet thick, the dipping bed is about 0.5 feet thick, and the lower bed is about 4.5 feet thick. To simulate water-based muds, the tank was filled with water having a resistivity of about 15 Ω-m, and to simulate oil-based muds, the experiment was repeated without water (air-filled borehole).

A prototype 610 was repeatedly passed along the borehole with different offsets, sensor orientations, borehole fluids, and antenna configurations. Offsets varied between 0" (tool contacts the borehole wall) and 1.5". The sensors were alternatively oriented to the north, east, south, and west for comparative measurements. The borehole fluids were water or air. Both pot core antennas and ferrite rod antennas were tested as transmitter antennas in combination with both types of antennas as receiver antennas. The receiver antenna spacing was 4" from center to center, and the center of the receiver pair was spaced 8" from the transmitter antenna. Transmit signal frequencies of 2 MHz and 8 MHz were tested.

Figure 8:
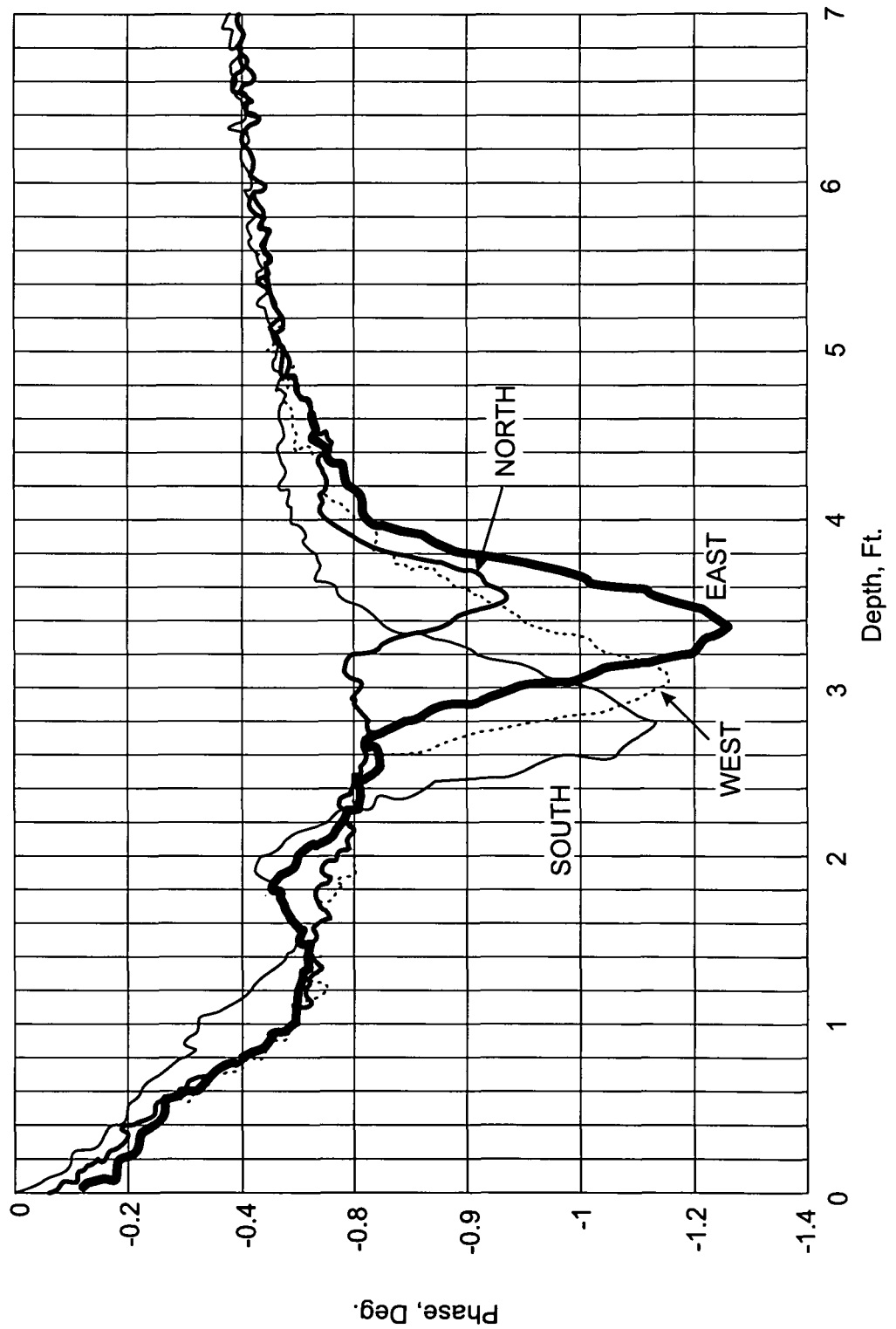
FIG. 8 is a graph of test results with ferrite rod antennas.

FIGS. 8-13 show measurement results for the various test conditions. The test parameters for FIG. 8 are as follows:

| Tx antenna: ferrite rod | Tx frequency: 2 MHz |
|---|---|
| Rx antenna: ferrite rod | BH fluid: water |

FIG. 8 compares the phase shift measurements at different azimuthal orientations of the sensor. In the graphs for each of the north, east, south, and west orientations, the presence of the dipping bed is clearly indicated by the dip in phase shift measurements at differing positions for the different orientations. Also apparent are the differing resistivities of the thick beds. Further analysis is desirable to determine the spatial resolution and resistivity measurement sensitivity, but it is apparent that in water-based fluids, the ferrite-rod to ferrite-rod antenna measurements have sufficient spatial resolution to permit borehole wall imaging and formation dip measurements.

Figure 9:
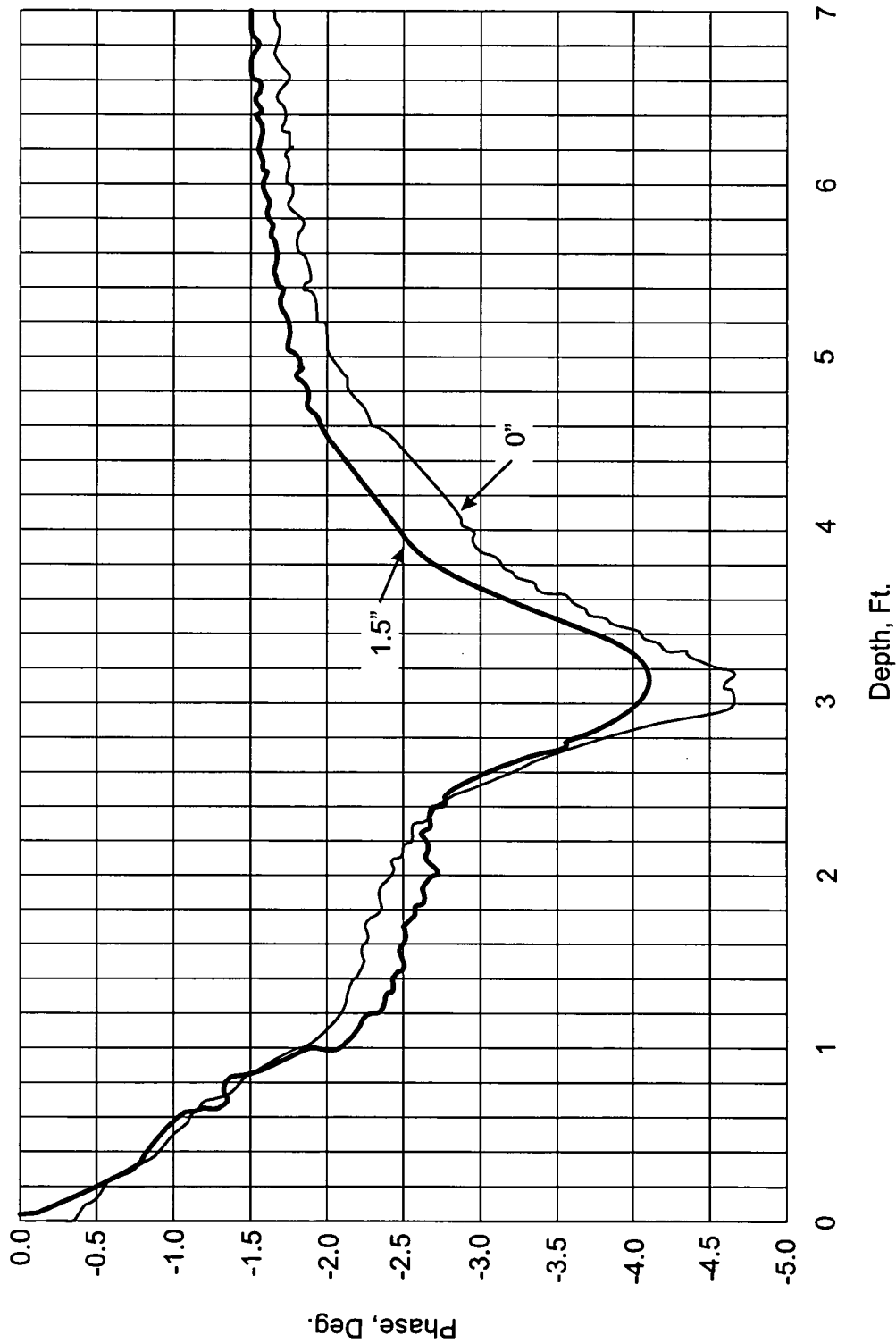
FIG. 9 is a graph of test results with ferrite rod antennas at different standoffs.

The test parameters for FIG. 9 are as follows:

| Tx antenna: ferrite rod | Tx frequency: 8 MHz |
|---|---|
| Rx antenna: ferrite rod | BH fluid: water |

FIG. 9 compares the phase shift measurements at different offsets from the borehole wall. The graphs for 0" offset and 1.5" offset each show the same shape, though the 1.5" offset curve exhibits slightly reduced phase shifts as compared to the 0" offset curve. Further analysis is desirable to fully characterize offset sensitivity, but it is apparent that this tool configuration is relatively insensitive to offset.

Figure 10:
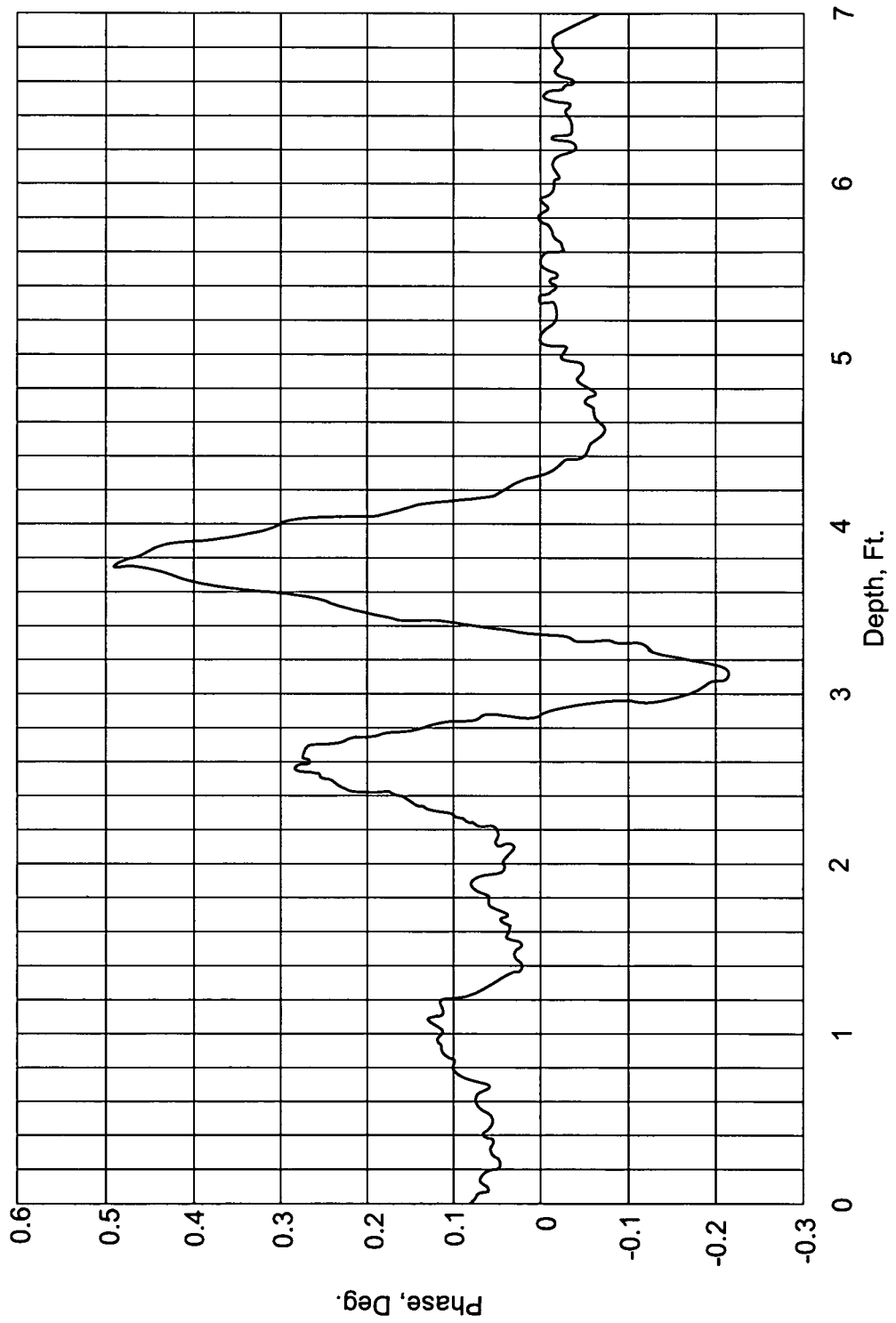
FIG. 10 is a graph of test results with ferrite rod antennas in a highly resistive fluid.

The test parameters for FIG. 10 are as follows:

| Tx antenna: ferrite rod | Tx frequency: 2 MHz |
|---|---|
| Rx antenna: ferrite rod | BH fluid: air |

FIG. 10 demonstrates the phase shift measurements of the tool in a non-conductive borehole fluid. Though the shape of the response curve is different, the sensitivity of the tool to the dipping bed is clearly apparent. Thus even in a non-conductive borehole fluid, the ferrite-rod to ferrite-rod antenna measurements will enable resistivity measurements and detection of thin dipping beds.

Figure 11:
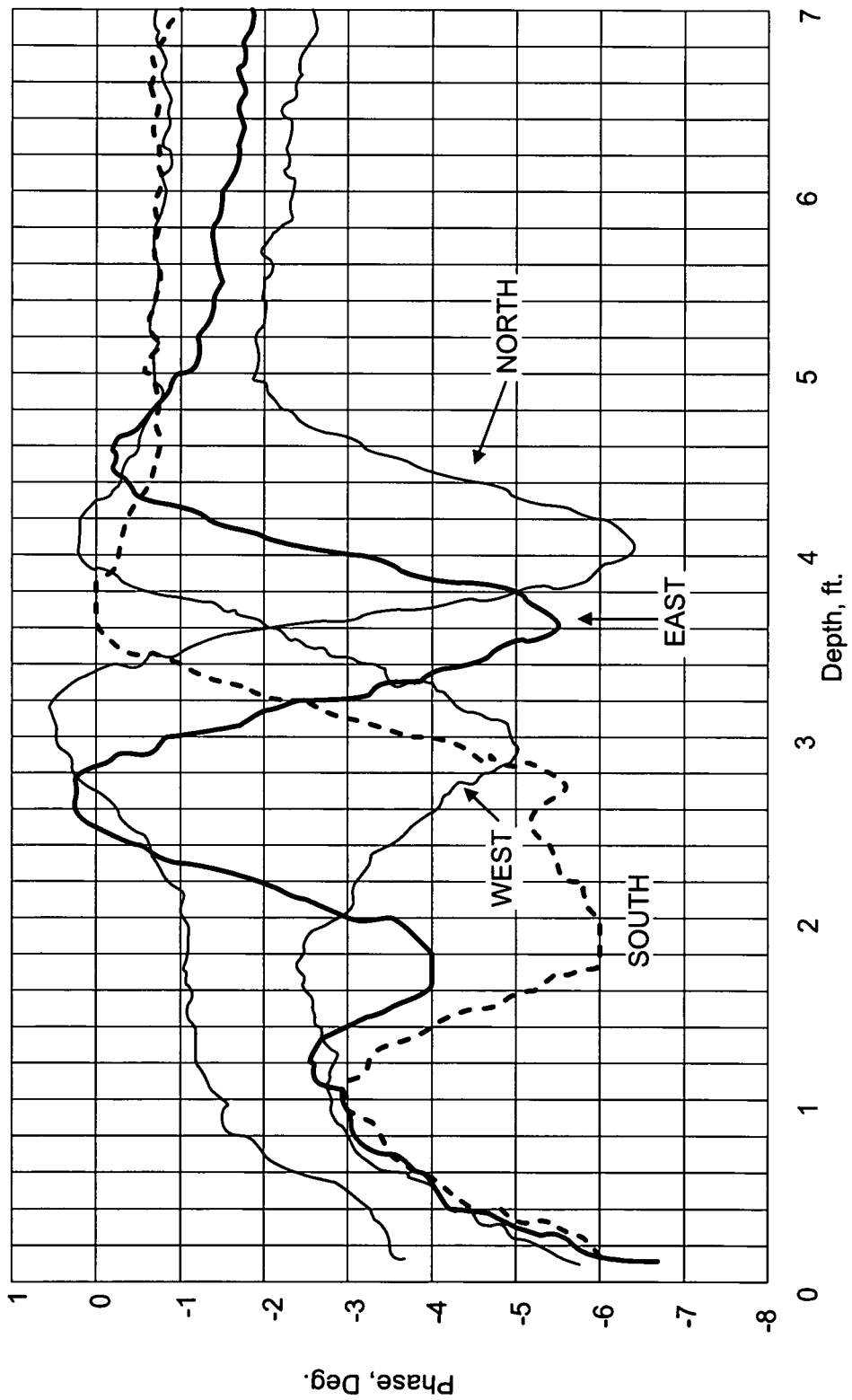
FIG. 11 is a graph of test results with a combination of antennas.

The test parameters for FIG. 11 are as follows:

| Tx antenna: pot core | Tx frequency: 2 MHz |
|---|---|
| Rx antenna: ferrite rod | BH fluid: water |

FIG. 11 compares the phase shift measurements at different azimuthal orientations of the sensor. In the graphs for each of the north, east, south, and west orientations, the presence of the dipping bed is clearly indicated by the dip in phase shift measurements at differing positions for the different orientation. Further analysis is desirable to determine the spatial resolution and resistivity measurement sensitivity, but it is apparent that in water-based fluids, the pot-core to ferrite-rod antenna measurements have sufficient spatial resolution to permit borehole wall imaging and formation dip measurements.

Figure 12:
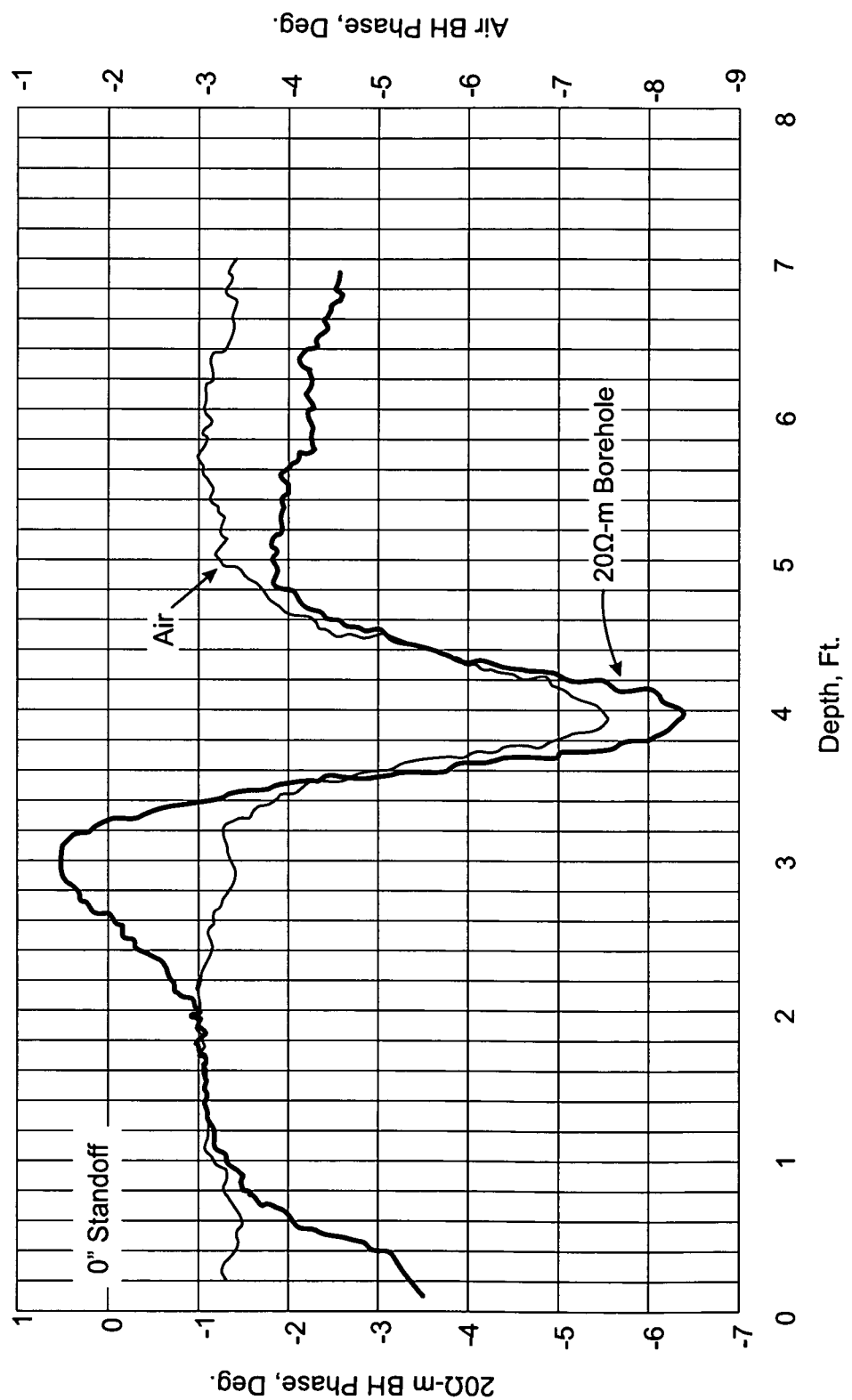
FIG. 12 is a graph of test results comparing performance in different borehole fluids.
Figure 13:
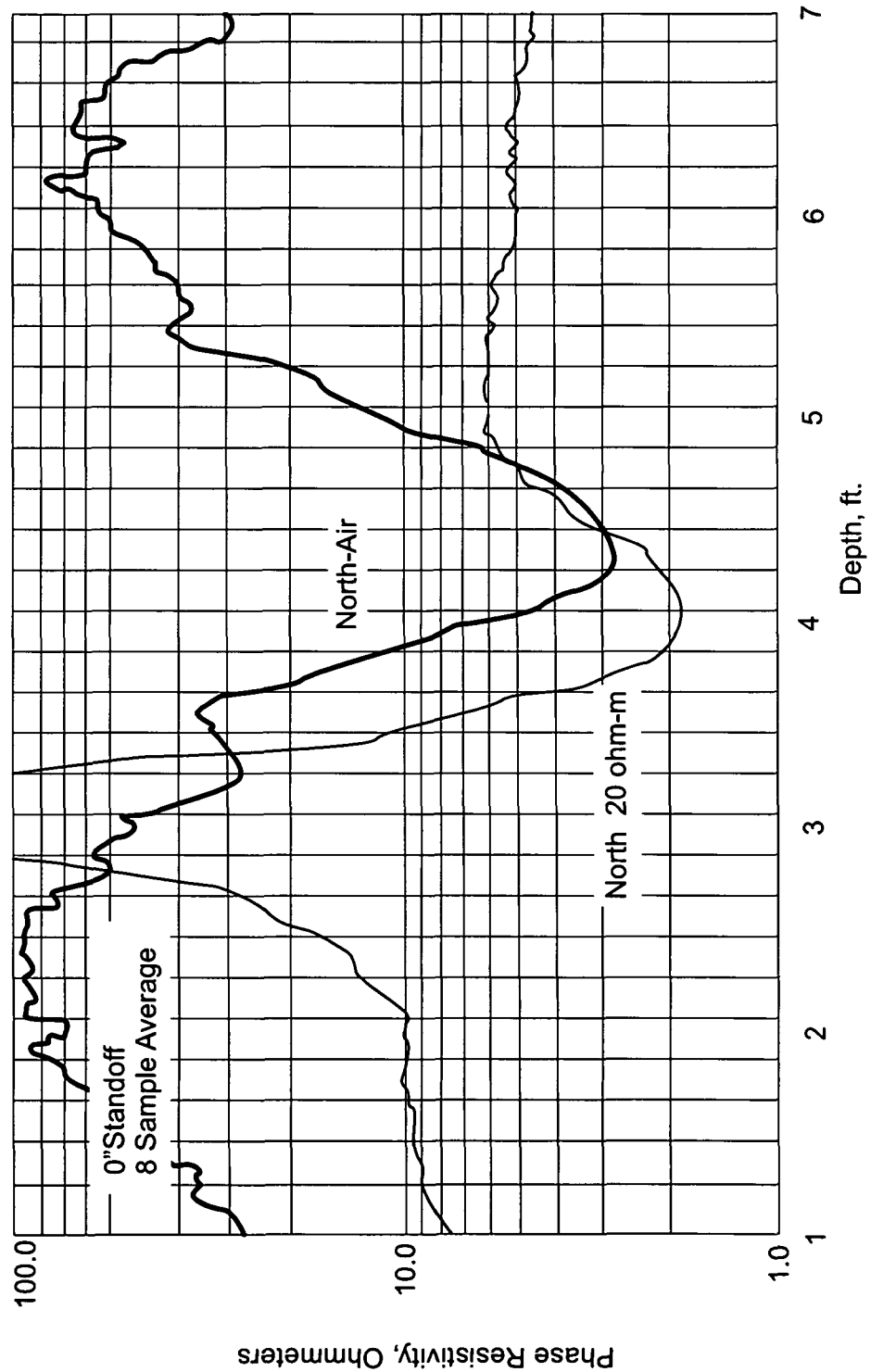
FIG. 13 is a graph of test results with a combination of antennas in a highly resistive fluid.

The test parameters for FIGS. 12 and 13 are as follows:

| Tx antenna: pot core | Tx frequency: 2 MHz |
|---|---|
| Rx antenna: ferrite rod | Standoff: 0" |

FIG. 12 compares phase shift measurements between different borehole fluids. (Note that the phase-shift curve for air has been shifted upward by 2 degrees as indicated by the y-axis coordinates on the right side of the figure.) In the graphs for both water and air, the presence of the dipping bed is clearly evident. Thus the pot-core to ferrite-rod antenna configuration will operate in both conductive and non-conductive borehole fluids. FIG. 13 shows an approximate resistivity determination based on the phase measurements in FIG. 12. The resistivity determination is based on an existing dipole model, and hence it does not account for the specific radiation patterns or tool calibration parameters. In practice, a more refined model would be employed. Nevertheless, the dipping bed appears in both curves. With further refinement of the models, the disclosed tool configuration should be suitable for resistivity logging in borehole fluids of any type. The model is expected to vary based on fluid resistivity, and hence the borehole fluid resistivity may be included as a model parameter to be measured independently or solved by inversion.

It is noted that due to the principle of reciprocity, the measurements made by the pot-core transmitter to ferrite-rod receiver antennas can also be made by ferrite-rod transmitter to pot-core receiver antennas. The azimuthal sensitivity of this tool enables measurements to be made in different azimuthal directions, potentially yielding enough information to enable measurement of resistive anisotropy and formation dip.

Numerous variations and modifications will become apparent to those skilled in the art once the above disclosure is fully appreciated. For example, the foregoing disclosure describes numerous antenna configurations in the context of a logging while drilling tool, such antenna configurations can also be readily applied to wireline logging tools. In addition, it is noted that the transmitter antennas may transmit very short (high bandwidth) pulses as an alternative to sinusoidal (narrow bandwidth) signals. Furthermore, the principle of reciprocity can be applied to obtain equivalent measurements while exchanging transmitter and receiver roles for each antenna. It is intended that the following claims be interpreted to embrace all such variations and modifications.

What is claimed is:

1. An electromagnetic resistivity logging tool having a tool axis, wherein the tool comprises:

a rotational position sensor;

at least one transmitter antenna and at least one receiver antenna wherein at least one of the transmitter and receiver antennas is a ferrite half-torus antenna; and a processor to receive at least one of a phase and amplitude measurement for at least one rotational position to determine a formation property.

2. The tool of claim 1, further comprising an extension mechanism to maintain said transmitter and receiver antennas in close proximity to a borehole wall.

3. The tool of claim 1, further comprising a stabilizer having a surface for contacting a borehole wall, wherein said transmitter and receiver antennas are embedded in said surface.

4. The tool of claim 1, wherein the processor associates each measurement with a position on a borehole wall.

5. The tool of claim 4, wherein the processor derives a formation resistivity image from the measurements.

6. The tool of claim 1, further comprising a second receiver antenna axially offset from the first receiver antenna.

7. The tool of claim 1, wherein the at least one transmitter antenna is a ferrite rod antenna and the at least one receiver antenna is a ferrite half-torus antenna.

8. The tool of claim 1, wherein the at least one transmitter antenna is a ferrite half-torus antenna and the at least one receiver antenna is a ferrite rod antenna.

9. An electromagnetic resistivity logging method comprising:

moving a logging while drilling (LWD) tool in a borehole in a formation;

sending an electromagnetic signal from at least one transmitter antenna into the formation;

receiving an electromagnetic signal from the formation with at least one receiver antenna, wherein at least one of the transmitter and receiver antennas is a ferrite half-torus antenna;

determining a formation property log based at least in part on the received electromagnetic signal.

10. The method of claim 9, wherein the transmitter antenna occupies less than 90 degrees of arc as measured from a longitudinal axis of the tool.

11. The method of claim 9, wherein the receiver antenna occupies less than 90 degrees of arc as measured from a longitudinal axis of the tool.

12. The method of claim 9, wherein the receiver antenna is a ferrite rod antenna and the transmitter antenna is a ferrite half-torus antenna.

13. The method of claim 9, wherein the transmitter antenna is a ferrite rod antenna and the receiver antenna is a ferrite half-torus antenna.

14. The method of claim 9, further comprising:

maintaining said surface in close proximity to a wall of the borehole.

15. The method of claim 9, further comprising:

associating each received signal measurement with a pixel to image a borehole wall; and displaying the borehole wall image.

16. The method of claim 9, wherein the formation property log is a resistivity log.

17. The method of claim 9, wherein the electromagnetic signal has a frequency greater than 500 kHz.

18. The method of claim 9, wherein the electromagnetic signal is a high-bandwidth signal pulse.

* * * * *